US012541619B2

(12) United States Patent
Sharma et al.

(10) Patent No.: US 12,541,619 B2
(45) Date of Patent: Feb. 3, 2026

(54) DYNAMIC CALIBRATION OF NOISE PARAMETERS FOR DATA SECURITY

(71) Applicant: Lemon Inc., Grand Cayman (KY)

(72) Inventors: Sagar Sharma, Culver City, CA (US); Xing Wu, Beijing (CN); Qiang Yan, Beijing (CN)

(*) Notice: Subject to any disclaimer, the term of this patent is extended or adjusted under 35 U.S.C. 154(b) by 161 days.

(21) Appl. No.: 18/317,507

(22) Filed: May 15, 2023

(65) Prior Publication Data

US 2024/0386131 A1 Nov. 21, 2024

(51) Int. Cl.
*G06F 21/62* (2013.01)

(52) U.S. Cl.
CPC ............... *G06F 21/6245* (2013.01)

(58) Field of Classification Search
CPC .... G06F 21/6218; G06F 21/604; G06F 21/64; G06F 21/62; G06F 21/10; H04L 63/102; H04L 63/20
See application file for complete search history.

(56) References Cited

U.S. PATENT DOCUMENTS

| | | | |
|---|---|---|---|
| 2007/0143289 A1 | 6/2007 | Dwork et al. | |
| 2018/0052894 A1* | 2/2018 | Eide | H04L 9/0662 |
| 2020/0311296 A1* | 10/2020 | Kim | G06F 21/6227 |
| 2020/0327252 A1* | 10/2020 | Mcfall | G06F 21/78 |
| 2021/0089882 A1* | 3/2021 | Sun | G06N 3/045 |
| 2021/0133590 A1* | 5/2021 | Amroabadi | G06N 3/04 |
| 2021/0256151 A1 | 8/2021 | Damewood et al. | |
| 2021/0319131 A1* | 10/2021 | Salomon | G06F 16/24528 |
| 2021/0357523 A1 | 11/2021 | Nerurkar et al. | |
| 2022/0229931 A1* | 7/2022 | Damewood | G06F 16/2462 |
| 2023/0032536 A1* | 2/2023 | Tello Guijarro | G06F 40/40 |
| 2023/0127699 A1* | 4/2023 | Liu | G06Q 50/16 706/12 |
| 2023/0130637 A1 | 4/2023 | Hosudurg et al. | |
| 2024/0135024 A1* | 4/2024 | Du | G06F 21/6227 |
| 2024/0135025 A1* | 4/2024 | Du | G06F 21/6227 |
| 2024/0303373 A1* | 9/2024 | Bijon | G06F 21/6245 |
| 2024/0311834 A1* | 9/2024 | Perez | G06Q 20/383 |

(Continued)

OTHER PUBLICATIONS

Hsu et al., "Differential Privacy: An Economic Method for Choosing Epsilon," CoRR, submitted on Feb. 2014, arXiv:1402.3329, 13 pages.

(Continued)

*Primary Examiner* — David J Pearson
*Assistant Examiner* — Nega Woldemariam
(74) *Attorney, Agent, or Firm* — Fish & Richardson P.C.

(57) ABSTRACT

Data security for a dataset in interactive query or operation from users regarding data stored in the dataset is provided. A method for providing data security for the dataset in secure data computation and communication includes generating a query result corresponding to the user query for the dataset, determining a magnitude range of the query result, and generating an amount of random noise data based on the magnitude range. The amount of random noise data is calibrated by adjusting at least one of a first tunable parameter within a first range and a second tunable parameter within a second range of a differential privacy (DP) configuration. A noise-laden query result is generated by applying the noise data to the query result to satisfy an error tolerance level.

17 Claims, 8 Drawing Sheets

(56) References Cited

U.S. PATENT DOCUMENTS

2024/0362355 A1* 10/2024 Bijon ............... G06F 16/24556
2024/0373212 A1* 11/2024 Mohammadi ......... H04W 12/02

OTHER PUBLICATIONS

International Search Report and Written Opinion in International Appln. No. PCT/SG2024/050312, mailed on Jul. 23, 2024, 4 pages.

McSherry, Frank D. "Privacy integrated queries: an extensible platform for privacy preserving data analysis." Proceedings of the 2009 ACM SIGMOD International Conference on Management of data. 2009.

Johnson, Noah, et al. "Chorus: a programming framework for building scalable differential privacy mechanisms." 2020 IEEE European Symposium on Security and Privacy (EuroS&P). IEEE, 2020, https://arxiv.org/pdf/1809.07750.pdf.

Rogers, Ryan, et al. "LinkedIn's Audience Engagements API: A privacy preserving data analytics system at scale." arXiv preprint arXiv:2002.05839 (2020), https://arxiv.org/pdf/2002.05839.pdf.

Wilson, Royce J., et al. "Differentially private SQL with bounded user contribution." Proceedings on privacy enhancing technologies 2020.2 (2020): 230-250, https://arxiv.org/pdf/1909.01917.pdf.

Dwork, Cynthia, and Aaron Roth. "The algorithmic foundations of differential privacy." Foundations and Trends® in Theoretical Computer Science 9.3-4 (2014): 211-407; https://www.cis.upenn.edu/~aaroth/Papers/privacybook.pdf.

* cited by examiner

DYNAMIC CALIBRATION OF NOISE PARAMETERS FOR DATA SECURITY

FIELD

The embodiments described herein pertain generally to data security for datasets. More specifically, the embodiments described herein pertain to providing data security in an interactive user query for a dataset for which noise is applied to query results to achieve a desired level of data privacy protection using differential privacy protocols or algorithms.

BACKGROUND

Differential privacy (DP) protocols and algorithms have been used to provide robust data privacy protection. For each interactive query or operation from a user regarding data stored in a dataset, DP protocols and algorithms may provide a certain level of data privacy protection (e.g., referred to as a differential privacy guarantee). For example, a data consumer (e.g., a user) may submit repeated queries or manipulate query parameters to obtain more information from the dataset than entitled. When receiving a query from a user regarding the dataset, the owner of the dataset may apply a noise generation mechanism to add a certain amount of random noise to the query result to protect data privacy before releasing the query result to the user. To apply the DP protocols and algorithms, static levels of DP parameters such as epsilon and delta are used to preset a privacy budget, which along with another DP parameter sensitivity of query function, can control the amount or level of noise to be added to the query result. A smaller pre-set privacy budget or higher sensitivity may require more noise to be added to the query result, which results in a noisier query result.

SUMMARY

Features in the embodiments disclosed herein may implement data security for a database by dynamically calibrating noise parameters using differential privacy (DP) protocols or algorithms. For example, when receiving a query from a user regarding data stored in a dataset, an amount of noise can be applied to the query result to provide perturbation before releasing the query result to the user. The amount or level of the noise to be applied can be dynamically controlled or calibrated based on a magnitude range of the query result and/or a user specified error tolerance level to balance data privacy/security and data accuracy/utility.

In one example embodiment, a method for providing data security for a dataset in secure data computation and communication is provided. The method includes generating a query result corresponding to a user query for the dataset, determining a magnitude range of the query result, adjusting at least one of a first tunable parameter within a first range and a second tunable parameter within a second range of a differential privacy (DP) configuration, and calibrating an amount of random noise data based on the magnitude range and at least one of the first tunable parameter and the second tunable parameter. The method further includes generating a noise-laden query result by applying the noise data to the query result to satisfy an error tolerance level, thereby perturbing the query result before releasing the query result, and thereby providing data security for the dataset.

In another example embodiment, a system for providing data security for a dataset in secure data computation and communication. The system includes a memory to store a dataset, and a processor to: generate a query result corresponding to a user query for the dataset; determine a magnitude range of the query result; determine a magnitude range of the query result; adjust at least one of a first tunable parameter within a first range and a second tunable parameter within a second range of a differential privacy (DP) configuration; and calibrate an amount of random noise data based on the magnitude range and at least one of the first tunable parameter and the second tunable parameter. The processor is further configured to generate a noise-laden query result by applying the amount of random noise data to the query result to satisfy an error tolerance level, thereby perturbing the query result before releasing the query result, and thereby providing data security for the dataset.

In yet another example embodiment, a non-transitory computer-readable medium having computer-executable instructions stored thereon is provided. The instructions, upon execution, cause one or more processors to perform operations including generating a query result corresponding to a user query for the dataset, determining a magnitude range of the query result, adjusting at least one of a first tunable parameter within a first range and a second tunable parameter within a second range of a differential privacy (DP) configuration, and calibrating an amount of random noise data based on the magnitude range and at least one of the first tunable parameter and the second tunable parameter, generating a noise-laden query result by applying the amount of random noise data to the query result to satisfy an error tolerance level, thereby perturbing the query result before releasing the query result, and thereby providing data security for the dataset.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
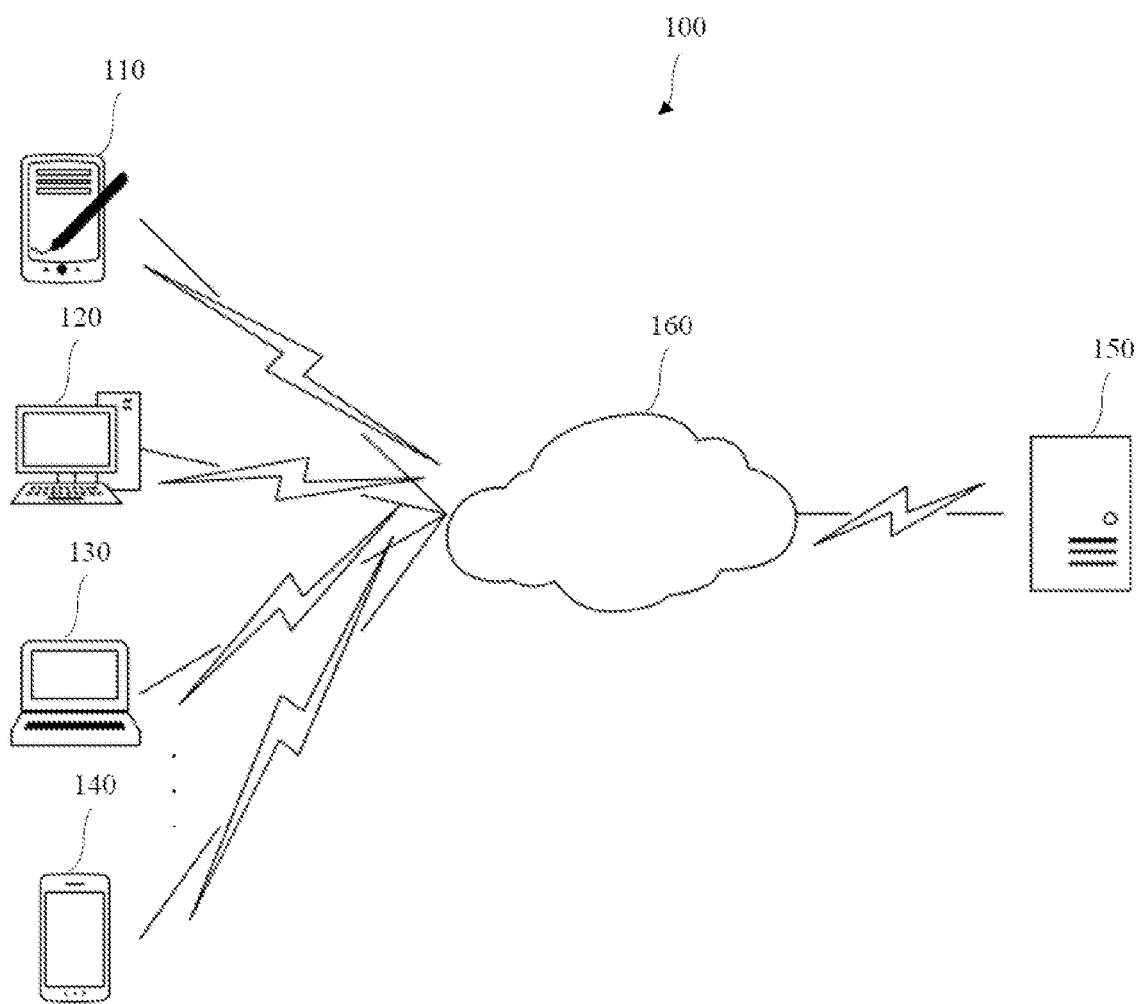
FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications.

As referenced herein, "differential privacy" or "DP" may refer to a standard, a protocol, a system, and/or an algorithm for publicly sharing information regarding a dataset by describing patterns of groups of elements within the dataset while withholding information about individual users listed in the dataset. It is to be understood that differential privacy may refer to a constraint on algorithms used to release aggregate information about a statistical dataset or database to a user, which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about individuals (e.g., the dataset includes records/rows of individuals). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

It is to be understood that the above requirement of the differential privacy protocol or algorithm may refer to a measure of "how much data privacy is afforded (e.g., by a single query or operation on the input dataset) when performing the operations or functions?" A DP parameter "$\epsilon$" or epsilon may refer to a privacy budget (i.e., a limit of how much data privacy it is acceptable with leaking), e.g., indicating a maximum difference between a query or operation on dataset A and the same query or operation on dataset A' (that differs from A by one element or record). The smaller the value of $\epsilon$ or epsilon is, the stronger the privacy protection is for the multi-identification privacy-protection mechanism. Another DP parameter "$\delta$" or delta may refer to a probability, such as a probability of information being accidentally leaked, which may be independent of DP parameter "$\epsilon$" or epsilon.

As referenced herein, "privacy budget" may refer to the total amount of privacy protection that a system can provide for data stored in a dataset, which can be measured in terms of DP parameters epsilon and/or delta values. The choice of DP parameters epsilon and/or delta values may depend on the specific use case and the desired level of privacy. In general, smaller values of DP parameters epsilon or delta may provide stronger privacy guarantees, but may result in less accurate query results.

In an example embodiment, a numeric value of DP parameter ϵ or epsilon (unit-less parameter) may be adjusted in a range, for example, from about 0 to about 10, from at or about 0.1 to about 10, or from at or about 0.1 to at or about 3. It is to be understood that a numeric value range of DP parameter ϵ or epsilon may be from about 0 to infinity, and it can be determined based on desired implementations. For example, a relatively stringent privacy requirement may need a numeric value of DP parameter ϵ or epsilon to be less than one.

In an example embodiment, a numeric value of DP parameter δ or delta (unit-less parameter) may be adjusted in a range, for example, from at or about $10^{-10}$ (or at about $10^{-8}$) to at or about $10^{-6}$. It is to be understood that the range can be determined based on desired implementations.

Yet another DP parameter sensitivity may refer to a quantified amount for how much noise perturbation may be required in the DP protocol or algorithm. It is to be understood that to determine the sensitivity, a maximum of possible change in the query result may need to be determined. That is, sensitivity may refer to an impact a change in the underlying dataset may have on the query result regarding data stored in the dataset. In an example, the sensitivity (unit-less parameter) can have a value of one.

It is to be understood that a differential privacy (DP) parameter (e.g., ϵ or epsilon, ϵ or delta, and sensitivity) may be a unit-less parameter that is used to measure a relative strength of privacy protection in differential privacy (DP) protocols or algorithms.

As referenced herein, "differential privacy composition" or "DP composition" may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation regarding data stored in the dataset has a privacy loss L, the cumulative impact of N queries (referred to as N-fold composition or N-fold DP composition) on data privacy may be greater than L but may be lower than L*N. In an example embodiment, an N-fold DP composition may be determined based on an N-fold convolution operation of the privacy loss distribution. For example, a DP composition of two queries may be determined based on a convolution of the privacy loss distribution of the two queries. In an example embodiment, the number N may be at or about 10, at or about 25, or any other suitable number. In an example embodiment, sensitivity, and/or the number N may be predetermined to achieve a desired or predetermined data privacy protection goal or performance.

As referenced herein, "a magnitude of query result," "a magnitude range of query result," "a value range of query result" may refer to a range of possible values that a query result may have. For example, when a query result returns the average age of a group of people, the magnitude range of the query result is the range of possible values that the average age may have, such as, for example, between 0 to 100 years.

As referenced herein, "magnitude bins," or "magnitude buckets," may refer to categories or groupings of the values of an aggregate query result into discrete intervals or bins based on the magnitudes of the values. An example of magnitude bins/buckets may be generated as: [0,500), [500, 1000), [1000, 1500), . . . . The width of a bin/bucket is defined as the difference between the upper and lower bounds of the bin. For example, the width of the bin [0,500) is 500. It is to be understood that a magnitude of a query result may have a unit determined by the type of data stored in the dataset being queried. The width of the bin can determine the granularity of the bins/buckets, with a smaller bin width resulting more fine-grained bins and a larger bin width resulting a coarser bin. There are various types of bins/buckets such as, for example, fixed-width bins where bins that are created with fixed-width intervals, exponential bins for which the width of the bins increases exponentially, etc. Suitable types of bins/buckets can be generated for various implementations. When a value of query result falls into a range of a bin, that range may be referred as a magnitude range of the query result. For example, when a query result has a value of 800, which is within the range of one of the bins [500,1000), the range [500, 1000) is determined as the magnitude range of the query result.

As referenced herein, "error of noisy result," or "noise error" may refer to the difference between a query result and a noisy query result (i.e., noise-laden query result) obtained by adding or injecting random noise data to the query result. Such an error can be controlled by the value of DP parameters such as epsilon and/or delta. For example, a lower value of DP parameter epsilon may result in more noise being added to the query result and a higher level of privacy protection. A higher value of DP parameter epsilon may result in less noise being added to the query result and a lower level of privacy protection. A noise error can be measured by using a certain error type such as, for example, mean relative error (MRE), median relative error (MdRE), root mean squared error (RMSE), etc. A noise error may be represented as a $P^{th}$ percentile measure, which can be directly compared to an error tolerance level.

As referenced herein, "an error tolerance level," or "a tolerance level" refers to an acceptable difference (i.e., noise error) between a query result and a noisy query result obtained by adding or injecting noise data into the query result. A smaller error tolerance level indicates a higher level of accuracy and a smaller allowable difference between the query result and the noisy query result. In one example embodiment, an error tolerance level may be defined as a percentage. For example, a user input may indicate an error tolerance level of query result to be 5%, 10%, or other desired percentages.

As referenced herein, "binomial distribution" in probability theory and statistics may refer to a discrete probability distribution of the number of successes in a sequence of n independent experiments, each asking a yes-no question, and each with its own Boolean-valued outcome: success (with probability p) or failure (with probability q=1−p). It is to be understood that Gaussian noise in the signal processing field may refer to a signal noise that has a probability density function equal to that of the normal distribution (i.e., the Gaussian distribution). In other words, the values that the Gaussian noise may take comply with a normal distribution (i.e., the Gaussian distribution). Similarly, binomial noise may refer to a signal noise that has a probability density function equal to that of the binomial distribution.

It is to be understood that the differential privacy requirements may be achieved via adding or injecting noise into a query result regarding data stored in the dataset studiously to form data anonymous, which may allow data users to execute all possible or useful statistical analysis on the dataset without identifying any personal information. It is also to be understood that adding controlled noise from a predetermined distribution (binomial distribution, Laplace distribution, normal/Gaussian distribution, etc.) may be a way of designing differentially private algorithms. It is further to be understood that adding noise may be useful for designing private protection mechanisms for real-valued functions on sensitive data.

Features in the embodiments disclosed herein may implement data security for a database by dynamically calibrating noise parameters using differential privacy (DP) protocols or algorithms. For example, when receiving a query from a user regarding data stored in a dataset, an amount of noise can be applied to the query result to provide perturbation before releasing the query result to the user. The amount or level of the noise to be applied can be dynamically controlled or calibrated based on a magnitude range of the query result and/or a user specified error tolerance level to balance data privacy/security and data accuracy/utility.

Features in the embodiments disclosed herein may provide efficient algorithms or protocols for dynamically controlling an amount or level of random noise to a query result in order to secure data privacy and provide accurate query results to satisfy a specified error tolerance level. Features (e.g., calibration of noise level by dynamically tuning or adjusting DP parameters, etc.) in the embodiments disclosed herein may provide a dynamic noise calibration implementation for generating noise-laden query results that satisfy an accuracy/utility requirement specified by the data consumer while minimizing the risk of information leakage. As a comparison, in previous solutions, when static levels of DP parameter(s) are used to control the amount of noise to be added to a query result, a data consumer may receive query results which are too noisy to use (i.e., not satisfy the specified error tolerance level), or the amount of noise may not be sufficient to protect data privacy.

FIG. 1 is a schematic diagram of an example secure computation and communication system, arranged in accordance with at least some embodiments described herein. In an example embodiment, the system 100 may be a database management system.

The system 100 may include terminal devices 110, 120, 130, and 140, a network 160, and a server 150 (e.g., a server for a database management platform). It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services, such as digital data survey services, etc., to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as data query services, or the like, may be installed on the terminal devices 110, 120, 130, and 140.

It is to be understood that software applications or services according to the embodiments described herein and/or according to the services provided by a database management system may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
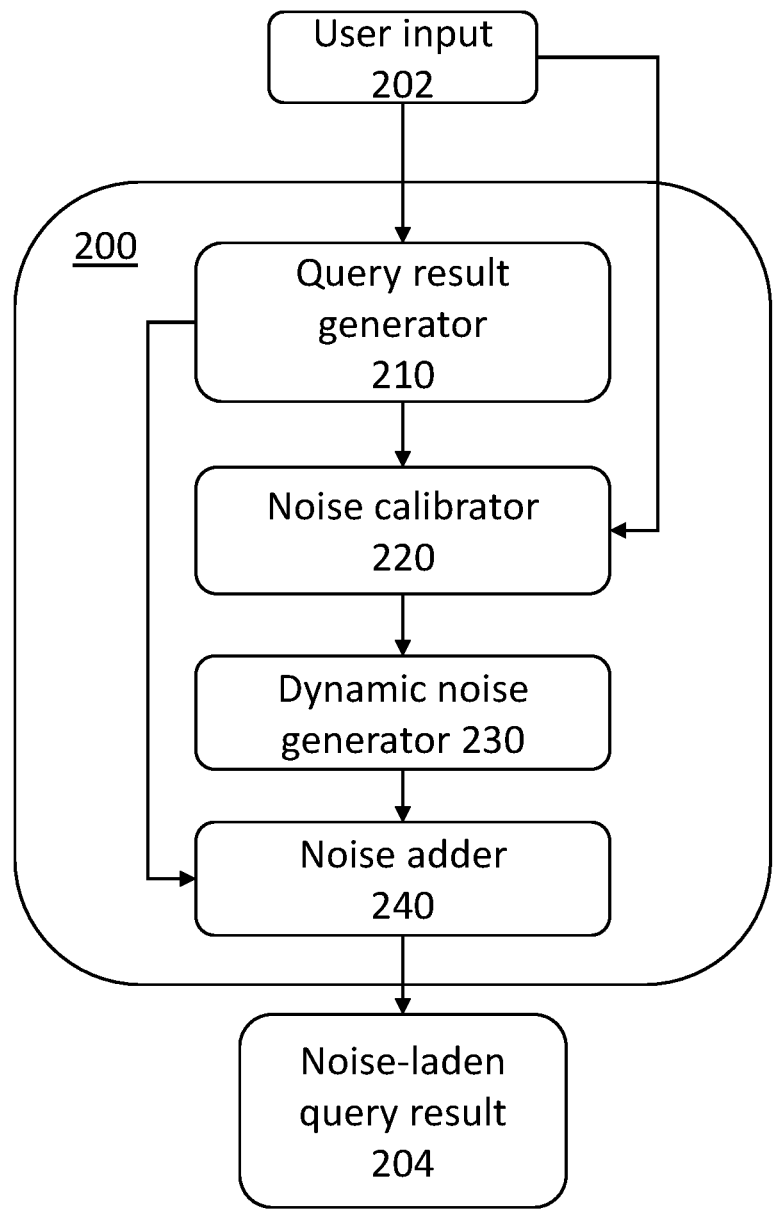
FIG. 2 is a block diagram of an example data security system, arranged in accordance with at least some embodiments described herein.

FIG. 2 is a schematic diagram of an example data security system 200 for providing data security for a dataset in secure data computation and communication, arranged in accordance with at least some embodiments described herein.

Data security system 200 includes functional blocks 210, 220, 230 and 240. It should be appreciated that such functional blocks may be realized by any number of hardware and/or software components configured to perform the specified functions. It is also to be understood that the data security system 200 and its functional blocks disclosed herein can be implemented by one or more processors (e.g., the processor of one or more of the terminal device 110, 120, 130, and 140 of FIG. 1, the processor of the server 150 of FIG. 1, the central processor unit 805 of FIG. 8, and/or any other suitable processor), unless otherwise specified.

Figure 4:
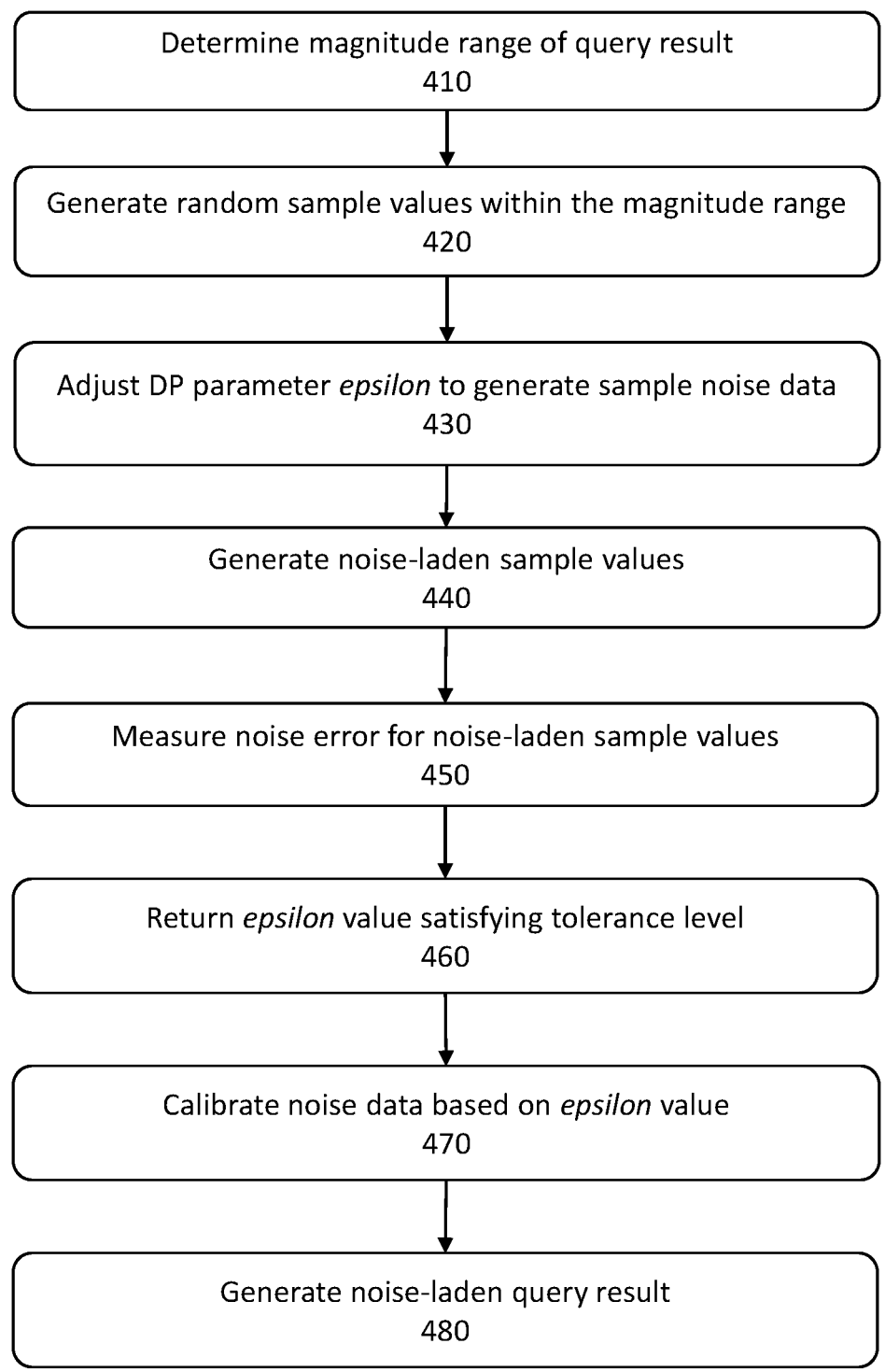
FIG. 4 shows a flow chart illustrating an example of the processing flow of FIG. 3, in accordance with at least some embodiments described herein.
Figure 5:
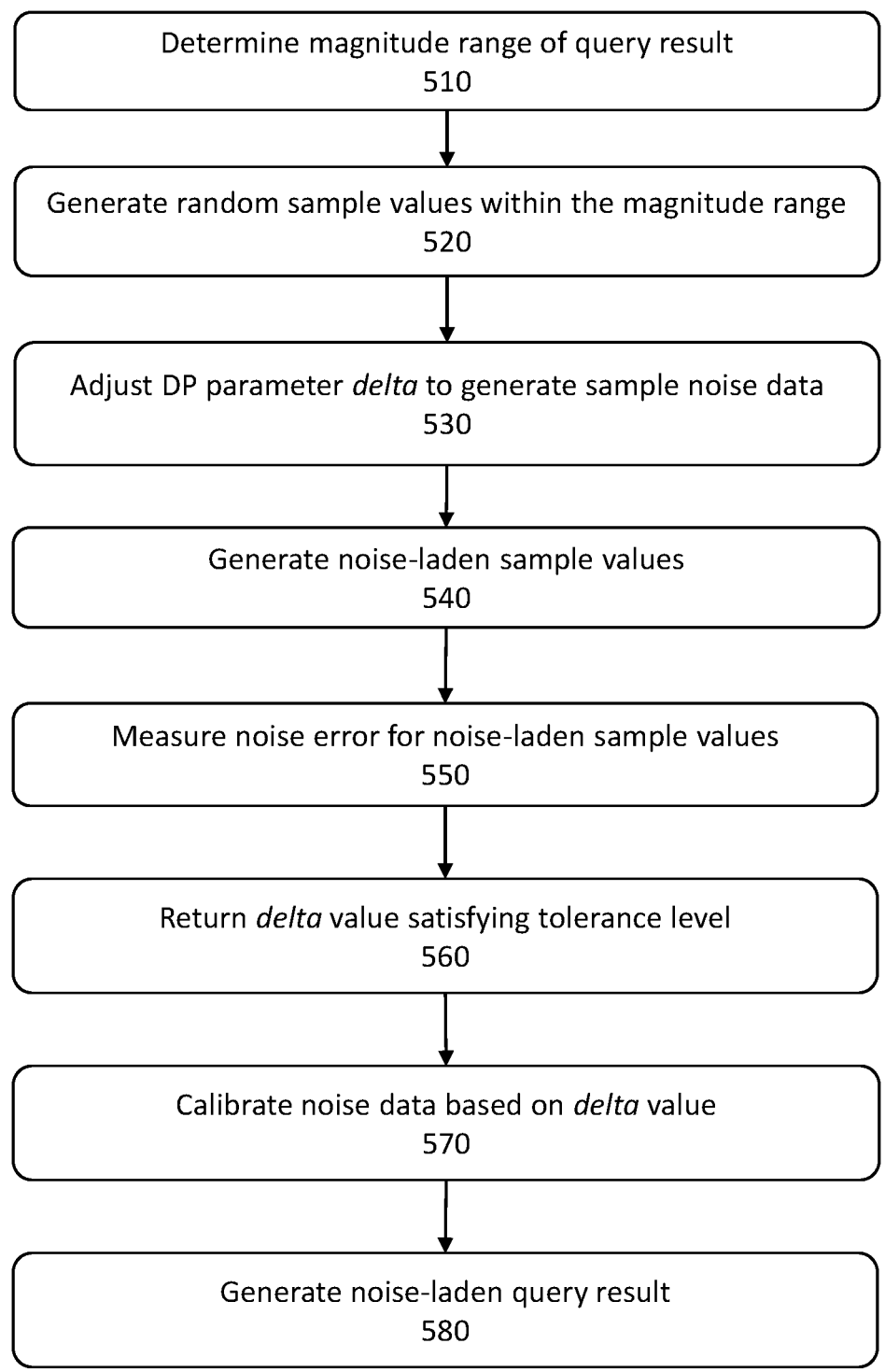
FIG. 5 shows a flow chart illustrating an example of the processing flow of FIG. 3, in accordance with at least some embodiments described herein.

Data security system 200 receives an interactive query or operation from user input 202 for data that may be stored in a dataset. Query result generator 210 of the system 200 generates a query result for the interactive query or operation. Noise calibrator 220 of the system 200 analyzes the query result to determine a magnitude range of the query result. Based on the determined magnitude range of the query result, the noise calibrator 220 can further calibrate an amount of random noise data by adjusting at least one of a first tunable parameter and a second tunable parameter of a differential privacy (DP). Example processes to calibrate the amount of random noise data are illustrated in FIGS. 4 and 5, which will be described further below. The calibrated amount can be sent to noise generator 230 to generate the corresponding random noise data.

Noise adder 240 of the system 200 adds or injects the amount of random noise data into the query results to generate a noise-laden query result 204 to be released to the user. The generated noise-laden query result 204 can satisfy an error tolerance level when compared to the query result. In an embodiment, the error tolerance level may be specified by the user input 202. Based on the received error tolerance level, the noise calibrator 220 can calibrate the amount of random noise data. In an embodiment, the noise calibrator 220 can designate an error tolerance level in an absence of the user input indicative of the error tolerance level.

Figure 3:
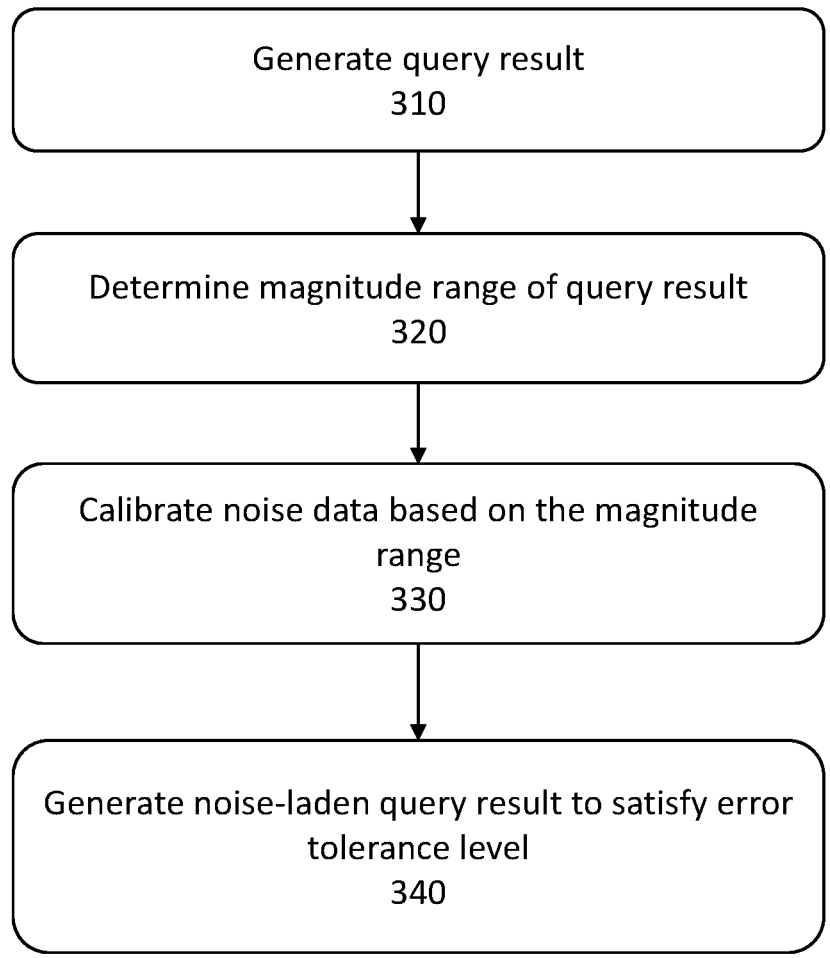
FIG. 3 is a flow chart illustrating an example processing flow for providing data security for a dataset, in accordance with at least some embodiments described herein.

FIG. 3 is a flow chart illustrating an example processing flow 300 for providing data security for a dataset in secure data computation and communication, in accordance with at least some embodiments described herein.

The processing flow 300 can be implemented by the system 200 of FIG. 2. It is to be understood that the processing flow 300 and the system 200 disclosed herein can be conducted by one or more processors (e.g., the processor of one or more of the terminal device 110, 120. 130, and 140 of FIG. 1, the processor of the server 150 of FIG. 1, the central processor unit 805 of FIG. 8, and/or any other suitable processor), unless otherwise specified.

These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. Processing flow 300 may begin at block 310.

At block 310 (Generate query result), upon receiving a user query regarding data stored in a dataset, the processor of the respective device may perform various operations on the data stored in the dataset to generate a query result for the user query. The user query may be an aggregate query. Examples of aggregate queries may include, for example, an average, a sum, a quantile, a count, a minimum, a maximum, etc. For example, the query result generator 210 of the system 200 may receive a user query to retrieve an average salary of employees in a company from data stored in a dataset. The query result generator 210 can operate the dataset to obtain a query result, for example, $ 80 k. In an example embodiment, to prevent possible privacy leakages, the generated query result may be made noisy by adding or injecting, via the noise adder 240, random noise data generated by the noise generator 230, to the query result with a predetermined portion of the total privacy budget available. Processing may proceed from block 310 to block 320.

At block 320 (Determine magnitude range of query result), the processor of the respective device may perform various operations to determine a magnitude range of the query result. In one example embodiment, the noise calibrator 220 of the system 200 can generate magnitude bins or buckets having their corresponding ranges, and determine the range of which the query result is within to be the magnitude range of the query result. For example, the noise calibrator 220 may generate magnitude bins including [0, 50 k), [50 k, 100 k), . . . , and determine that the above query result value 80 k is within the range [50 k, 100 k), which is then determined as a magnitude range of the query result. It is to be understood that any suitable types of magnitude bins or buckets can be generated, depending on the desired implementation. In an example embodiment, to prevent possible privacy leakages, the determined magnitude range may be made noisy by adding or injecting, via the noise adder 240, random noise data generated by the noise generator 230, to the determined magnitude range with a predetermined portion of the total privacy budget available. Processing may proceed from block 320 to block 330.

At block 330 (Calibrate noise data based on the magnitude range), the processor of the respective device may perform various operations to calibrate an amount of random noise data based on the magnitude range. The amount of random noise data can be calibrated by adjusting at least one of a first tunable parameter and a second tunable parameter of a differential privacy (DP) configuration. In one example embodiment, the first tunable parameter refers to a DP parameter "$\epsilon$" or epsilon, and the second tunable parameter refers to a DP parameter "$\delta$" or delta. In one example embodiment, the noise calibrator 220 of the system 200 can calibrate the amount of random noise data by adjusting the first tunable parameter within a first predetermined range. In another example embodiment, the noise calibrator 220 of the system 200 can calibrate the amount of random noise data by adjusting the second tunable parameter within a second predetermined range while fixing the first tunable parameter at a predetermined value. The amount of random noise data to be generated, e.g., by the noise generator 230, can be controlled or calibrated by the adjusted first and/or second parameters along with other predetermined DP parameters. The noise generator 230 can generate the calibrated amount of random noise data according to a noise distribution including, for example, a Laplace distribution, an exponential configuration, or a Gaussian distribution. Processing may proceed from block 330 to block 340.

At block 340 (Generate noise-laden query result to satisfy error tolerance level), the processor of the respective device may perform various operations to generate the noise-laden query result 204 by applying the noise data to the query result to satisfy an error tolerance level when compared to the query result. In one example embodiment, the noise adder 240 of the system 200 can apply the amount of noise data by adding or injecting the amount of noise data into the query result. For example, a generated random noise value of 4 k can be added to the above query result value of 80 k to generate a noise-laden query result value of 84 k. A percentile error of the noise-laden query result is determined to be, for example, 5%, which is lower than a predetermined error tolerance level 10%, and thus satisfies the error tolerance level.

FIG. 4 shows a flow chart illustrating an example 400 of the processing flow 300 of FIG. 3, in accordance with at least some embodiments described herein.

These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized. Processing flow 400 may begin at block 410.

At block 410 (Determine magnitude range of query result), the processor of the respective device may perform various operations to determine a magnitude range of the query result. In one example embodiment, the noise calibrator 220 of the system 200 can generate magnitude bins or buckets having their corresponding ranges, and determine the range of which the query result is within to be the magnitude range of the query result. In one example described above, a magnitude range of [50 k, 100 k) is determined for a query result value of 80 k. Processing may proceed from block 410 to block 420.

At block 420 (Generate random sample values within the magnitude range), the processor of the respective device may perform various operations to generate random sample values within the determined magnitude range. In one example embodiment, the noise generator 230 can generate t random sample values within the determined magnitude range according to a suitable distribution (e.g., a uniform random distribution, an exponential distribution, etc.), where t refers to the sample size of the random sample values. For example, a number t of random sample values can be generated by the noise generator 230 within the determined magnitude range of [50 k, 100 k). An example of the random sample values is 61 k which is within the magnitude range of [50 k, 100 k). The number t can be predetermined in a range, for example, from 100 to 10,000. It is to be understood that the number t may be any suitable numbers, dependent on desired implementations. Processing may proceed from block 420 to block 430.

At block 430 (Adjust DP parameter epsilon to generate sample noise data), the processor of the respective device may perform various operations to adjust the DP parameter epsilon to generate sample noise data to be added or injected into each of the sample values generated at block 420. In one example embodiment, the noise calibrator 220 of the system 200 can adjust the values of DP parameter epsilon within a predetermined range. For example, a sequence of values within the predetermined range can be applied for adjusting DP parameter epsilon. The granularity of the sequence can be determined by an epsilon step parameter. For each DP parameter epsilon value, the noise generator 230 can generate a sample noise data according to a suitable noise distribution. It is to be understood that the amount of sample noise data to be generated can be controlled, via the noise calibrator 220 of the system 200, by providing values of DP parameter epsilon along with other DP parameters such as sensitivity. A lower value of DP parameter epsilon may result in a greater amount of sample noise data. For each DP parameter epsilon value, the amount of sample noise data can be substantially proportional to the sensitivity. In one example, a noise value of 2 k can be generated for the above sample value 61 k. Processing may proceed from block 430 to block 440.

At block 440 (Generate noise-laden sample values), the processor of the respective device may perform various operations to generate noise-laden sample values by applying the sample noise data to the corresponding sample value. In one example, the noise adder 240 of the system 200 can add or inject the sample noise data to the corresponding sample values to generate the noise-laden sample values. For example, the noise value of 2 k can be added to the corresponding sample value 61 k to generate a noise-laden sample value of 63 k. Processing may proceed from block 440 to block 450.

At block 450 (Measure noise error for the noise-laden sample values), the processor of the respective device may perform various operations to measure a noise error for the noise-laden sample values. In one example embodiment, the noise calibrator 220 of the system 200 can compare the noise-laden sample values to the corresponding sample values to determine the respective noise errors. The noise errors may be represented as a $P^{th}$ percentile measure, which can be directly compared to a predetermined error tolerance level. Processing may proceed from block 450 to block 460.

At block 460 (Return epsilon value satisfying tolerance level), the processor of the respective device may perform various operations to conduct iterations (e.g., iterations from blocks 420 to 450) for each noise value and each DP parameter epsilon value to return the smallest value of DP parameter epsilon to satisfy a predetermined error tolerance level. In one example embodiment, when the $P^{th}$ percentile measure of the noise errors is no greater than the predetermine error tolerance level, the noise calibrator 220 of the system 200 can determine that the corresponding DP parameter epsilon value satisfies the predetermine error tolerance level. In another embodiment, the noise calibrator 220 may determine the DP parameter epsilon value based on predetermined theoretical bounds of a noise distribution to be used, which will be described further below. Processing may proceed from block 460 to block 470.

At block 470 (Calibrate noise data based on epsilon value), the processor of the respective device may perform various operations to calibrate the amount of random noise data based on the smallest value of DP parameter epsilon determined at block 460. In one example embodiment, the noise generator 230 can generate the calibrated amount of random noise data according to a suitable noise distribution. In one example embodiment, the noise distribution used to generate the random noise data at block 470 may be substantially the same as that used to generate the sample noise data at block 430. Processing may proceed from block 470 to block 480.

At block 480 (Generate noise-laden query result), the processor of the respective device may perform various operations to generate a noise-laden query result by applying the calibrated amount of random noise data to the query result. In one example embodiment, the noise adder 240 of the system 200 adds or injects an amount of random noise data to the query result to generate noise-laden query result. It is to be understood that the determined value of DP parameter epsilon may control the amount of noise data to be added to the query result. A lower value of DP parameter epsilon may result in a greater amount of noise data being added to the query result and a higher level of privacy protection. A higher value of DP parameter epsilon may result in a less amount of noise data being added to the query result and a lower level of privacy protection.

FIG. 5 shows a flow chart illustrating an example 500 of the processing flow 300 of FIG. 3, in accordance with at least some embodiments described herein.

These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized. Processing flow 500 may begin at block 510.

At block 510 (Determine magnitude range of query result), the processor of the respective device may perform various operations to determine a magnitude range of the query result. In one example embodiment, the noise calibrator 220 of the system 200 can generate magnitude bins or buckets having their corresponding ranges, and determine the range of which the query result is within to be the magnitude range of the query result. In one example described above, a magnitude range of [50 k, 100 k) is determined for a query result value of 80 k. Processing may proceed from block 510 to block 520.

At block 520 (Generate random sample values within the magnitude range), the processor of the respective device may perform various operations to generate random sample values within the determined magnitude range. In one sample embodiment, the noise generator 230 can generate t random sample values within the determined magnitude range according to a suitable distribution (e.g., a uniform random distribution, an exponential distribution, etc.), where t refers to the sample size of the random sample values. For example, a number t of random sample values can be generated within the determined magnitude range of [50 k, 100 k). An example of the sample values is 61 k. The number t can be predetermined in a range, for example, from 100 to 10,000. It is to be understood that the number 1 may be any suitable numbers, dependent on desired implementations. Processing may proceed from block 520 to block 530.

At block 530 (Adjust DP parameter delta to generate sample noise data), the processor of the respective device may perform various operations to adjust the DP parameter delta to generate an amount of sample noise data to be added or injected into each of the sample values generated at block 520. In one example embodiment, the noise calibrator 220 of the system 200 can adjust the values of DP parameter delta within a predetermined range. For example, a sequence of values within the predetermined range can be applied for adjusting DP parameter delta. For each DP parameter delta value, the noise generator 230 can generate a sample noise data according to a suitable noise distribution. It is to be understood that the amount level of sample noise data to be generated can be controlled or calibrated, via the noise calibrator 220 of the system 200, by providing values of DP parameter delta along with other DP parameters such as sensitivity. In this example embodiment, the DP parameter epsilon is fixed at a pre-set value for each DP parameter delta value. Processing may proceed from block 530 to block 540.

At block 540 (Generate noise-laden sample values), the processor of the respective device may perform various operations to generate noise-laden sample values by applying the amount of sample noise data to the corresponding sample value. In one example, the noise adder 240 of the system 200 can add or inject the amount of sample noise data to the corresponding sample values to generate the noise-laden sample values. Processing may proceed from block 540 to block 550.

At block 550 (Measure noise error for the noise-laden values), the processor of the respective device may perform various operations to measure a noise error for the noise-laden values. In one example embodiment, the noise calibrator 220 of the system 200 can compare the noise-laden sample values to the corresponding sample values to determine the respective noise errors. The noise errors may be represented as a $P^{th}$ percentile measure, which can be directly compared to a predetermined error tolerance level. Processing may proceed from block 550 to block 560.

At block 560 (Return delta value satisfying tolerance level), the processor of the respective device may perform various operations to conduct iterations (e.g., iterations from blocks 520 to 550) for each noise value and each DP parameter delta value to return the smallest value of DP parameter delta that can have the noise error to satisfy a predetermined error tolerance level. In one example embodiment, when the $P^{th}$ percentile measure of the noise errors is no greater than the predetermine error tolerance level, the noise calibrator 220 of the system 200 can determine that the corresponding DP parameter delta value satisfies the predetermine error tolerance level. Processing may proceed from block 560 to block 570.

At block 570 (Calibrate noise data based on delta value), the processor of the respective device may perform various operations to calibrate the amount of random noise data based on the smallest value of DP parameter delta determined at block 560. In one example embodiment, the noise generator 230 can generate the calibrated amount of random noise data according to a suitable noise distribution. In one example embodiment, the noise distribution used to generate the random noise data at block 570 may be substantially the same as that used to generate the sample noise data at block 530. Processing may proceed from block 570 to block 580.

At block 580 (Generate noise-laden query result), the processor of the respective device may perform various operations to generate a noise-laden query result by applying the calibrated amount of random noise data to the query result. The noise adder 240 of the system 200 adds or injects the amount of random noise data to the query result to generate noise-laden query result. It is to be understood that in this embodiment, the DP parameter epsilon is predetermined at a fixed value, and the value of DP parameter delta is adjusted to control or calibrate the amount of noise data to be added to the query result.

As described above, when the data security system 200 receives user queries for the dataset, the system 200 can conduct a processing flow such as 300 of FIG. 3, 400 of FIG. 4, and 500 of FIG. 5, to provide corresponding noise-laden query results to satisfy the respective accuracy/utility requirements (e.g., user-specified error tolerance levels). In one example embodiment, the system 200 can cache related data in an expandable search grid data structure when operating the above processing flow to generate the noise-laden query results for various user queries. The cached data may include, for example, the received user query and the corresponding query result at block 310, 410, 510, the corresponding magnitude range of the query result at block 320, 410, 510, the measured noise errors at block 460, 560, the determined DP parameter epsilon value at 460, the determined DP parameter delta value at block 560, etc. The user-specified, or designated error tolerance level can also be cached in the expandable search grid data structure. It is to be understood that other DP parameters such as sensitivity used in the processing flows may also be cached in the expandable search grid data structure. In one example embodiment, the expandable search grid data structure may include a tree data structure such as, e.g., data structure 600 of FIG. 6, and data structure 700 of FIG. 7, which will be described further below.

When the system 200 receives a new user query for the dataset, with the historical data cached in expandable search grid data structure, the system 200 can traverse through the data structure to find the appropriate values for DP parameters (e.g., epsilon and/or delta) that can control or calibrate the generated noise-laden query result to meet the specified error tolerance level. In one example embodiment, the system 200 can generate query result for the new user query, determine a new magnitude range of the second query result, traverse through the expandable search grid data structure to determine a value for at least one of the first tunable parameter and the second tunable parameter based on the historical data cached in the expandable search grid data structure. The determined value for at least one of the first tunable parameter and the second tunable parameter can be used, along with other parameters, to control the amount of random noise data to be applied to the query result such that the generate noise-laden query result can satisfy the specified accuracy/utility requirement (e.g., a user-specified error tolerance level).

Figure 6:
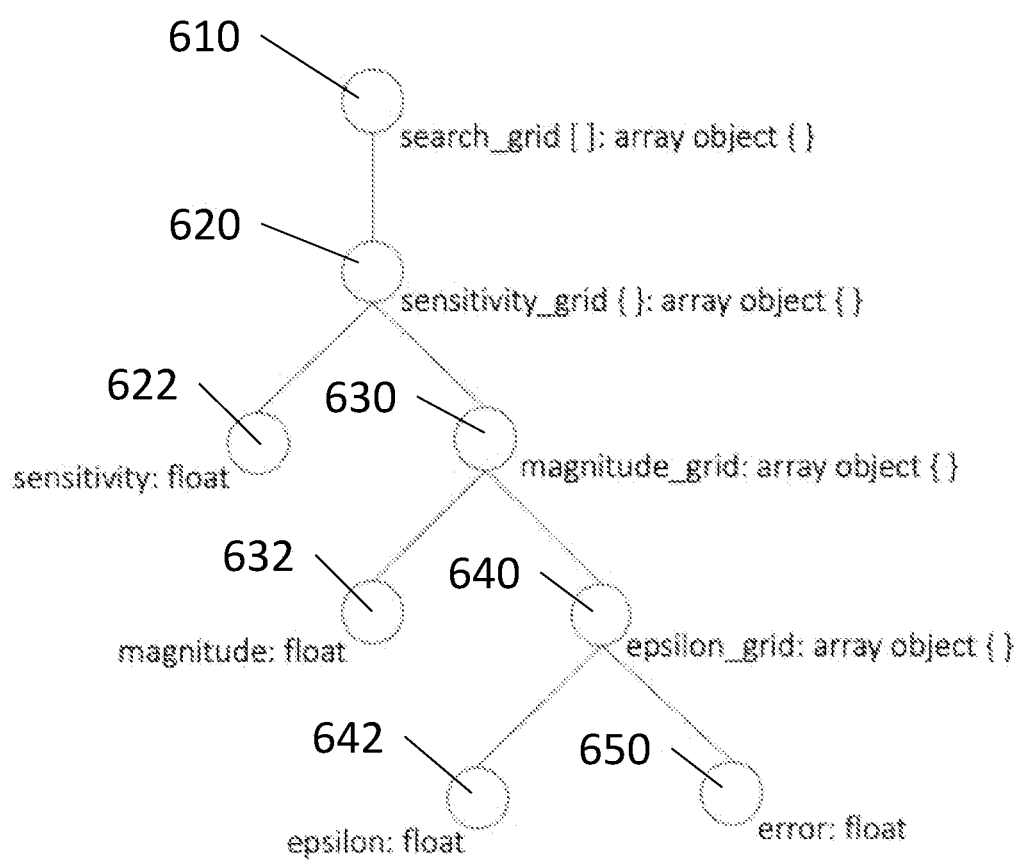
FIG. 6 is a schematic diagram illustrating an example expandable search grid data structure, in accordance with at least some embodiments described herein.

FIG. 6 is a schematic diagram illustrating an example expandable search grid data structure 600, in accordance with at least some embodiments described herein. The example expandable search grid data structure 600 has a tree structure with a root 610 including an array of objects each being a sensitivity grid 620. The sensitivity grid 620 is an array of objects with sensitivity values 622 and a magnitude grid 630 as properties. The magnitude grid 630 is an array of objects with magnitude ranges 632 and an epsilon grid 640 as properties. The epsilon grid 640 is an array of objects with epsilon values 642 and noise error values 644 as properties.

Figure 7:
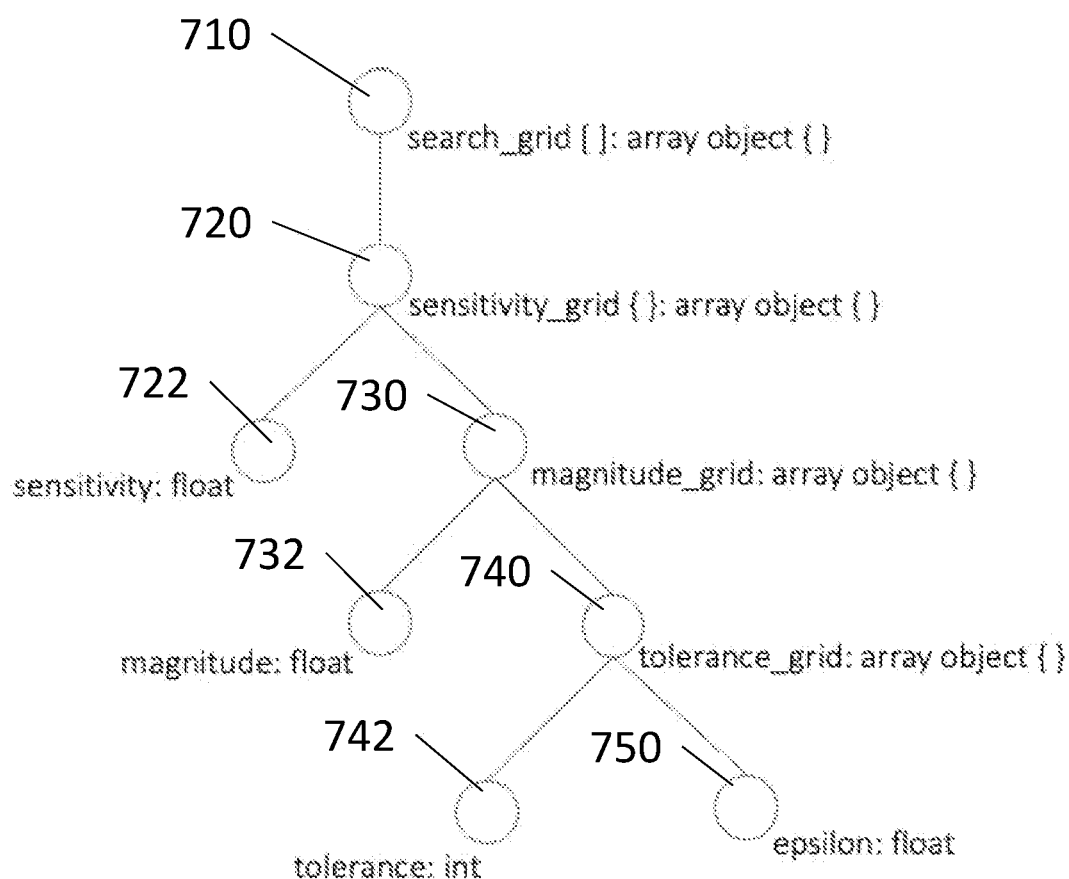
FIG. 7 is a schematic diagram illustrating an example expandable search grid data structure, in accordance with at least some embodiments described herein.

FIG. 7 is a schematic diagram illustrating an example expandable search grid data structure 700, in accordance with at least some embodiments described herein. The example expandable search grid data structure 700 has a tree structure with a root 710 including an array of objects each being a sensitivity grid 720. The sensitivity grid 720 is an array of objects with sensitivity values 722 and a magnitude grid 730 as properties. The magnitude grid 730 is an array of objects with magnitude ranges 732 and an error tolerance level grid 740 as properties. The error tolerance level grid 740 is an array of objects with error tolerance levels 742 and epsilon values 750 as properties.

The processing flows 400, 500 of FIGS. 4 and 5 illustrate examples of empirical methods for adjusting DP parameters epsilon and delta for providing data security for a dataset in secure data computation and communication. In some embodiments, the noise calibrator 220 of the data security system 200 may determine an appropriate DP parameter epsilon or delta value for a query result based on predetermined theoretical bounds of a noise distribution to be used by the noise generator 230. It is to be understood that, in an example embodiment, for determining the appropriate DP parameter epsilon value, the noise calibrator 220 may preset a desired value of DP parameter delta, and in another example embodiment, for determining the appropriate DP parameter delta value, the noise calibrator 220 may preset a desired value of DP parameter epsilon. For example, when a Laplace distribution is used by the noise generator 230 for noise generation, the noise calibrator 220 can determine theoretical bounds on the accuracy of the Laplace distribution for certain sensitivity and DP parameter epsilon values based on suitable DP protocols or algorithms. DP parameter epsilon values can be calculated according to Equation:

$$\epsilon = \ln\left(\frac{1}{1-p}\right)\frac{\Delta}{\tau|y|},$$

where $\epsilon$ denotes DP parameter epsilon, p denotes the $p^{th}$ percentile measure of noise error, $\Delta$ denotes sensitivity, $\tau$ denotes error tolerance level, and y can be set as $y_{min}$ and $y_{max}$ for the magnitude ranges of each magnitude grid 630 in FIG. 6. The DP parameter epsilon value can be determined by averaging two epsilon values corresponding to $y_{min}$ and $y_{max}$. It is to be understood that DP parameters epsilon and/or delta values can be determined for suitable noise distributions other than a Laplace distribution.

Figure 8:
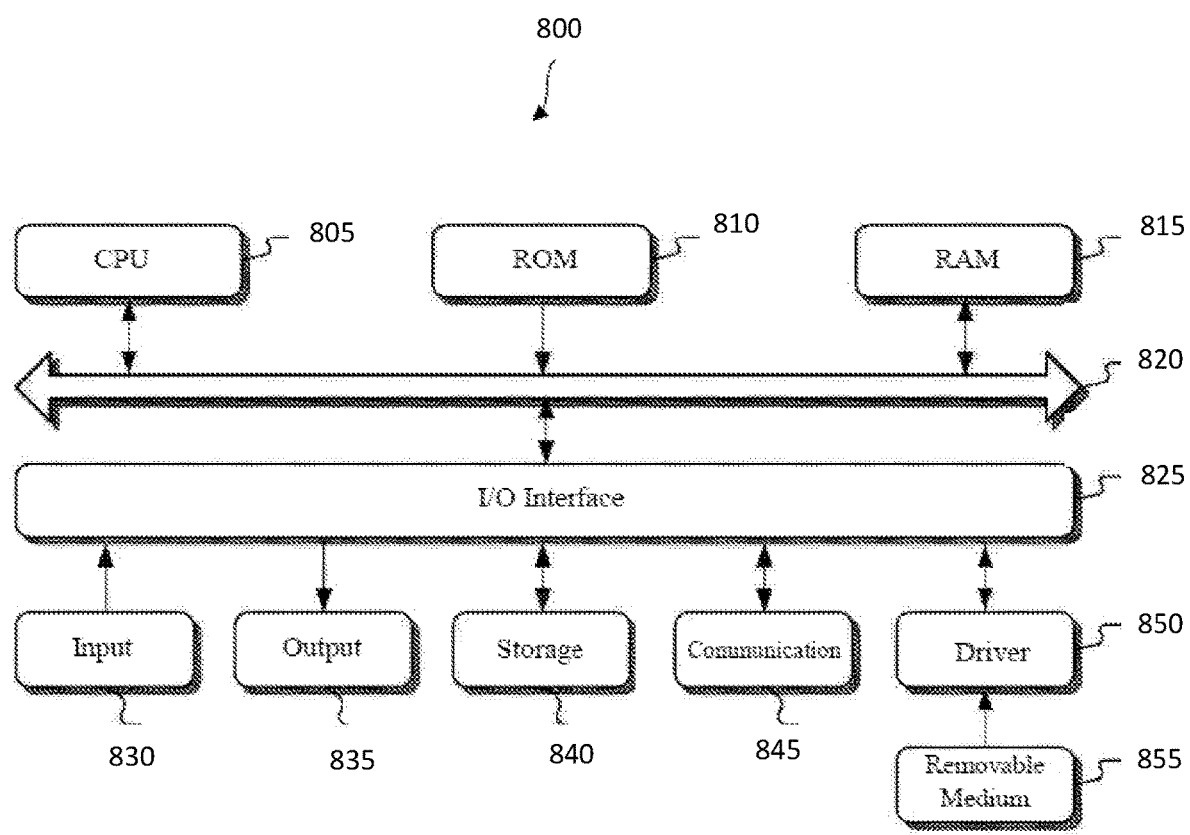
FIG. 8 is a schematic structural diagram of an example computer system applicable to implementing an electronic device, arranged in accordance with at least some embodiments described herein.

FIG. 8 is a schematic structural diagram of an example computer system 800 applicable to implementing an electronic device (for example, the server or one of the terminal devices shown in FIG. 1), arranged in accordance with at least some embodiments described herein. It is to be understood that the computer system shown in FIG. 8 is provided for illustration only instead of limiting the functions and applications of the embodiments described herein.

As depicted, the computer system 800 may include a central processing unit (CPU) 805. The CPU 805 may perform various operations and processing based on programs stored in a read-only memory (ROM) 810 or programs loaded from a storage device 840 to a random-access memory (RAM) 815. The RAM 815 may also store various data and programs required for operations of the system 800. The CPU 805, the ROM 810, and the RAM 815 may be connected to each other via a bus 820. An input/output (I/O) interface 825 may also be connected to the bus 820.

The components connected to the I/O interface 825 may further include an input device 830 including a keyboard, a mouse, a digital pen, a drawing pad, or the like; an output device 835 including a display such as a liquid crystal display (LCD), a speaker, or the like; a storage device 540 including a hard disk or the like; and a communication device 845 including a network interface card such as a LAN card, a modem, or the like. The communication device 845 may perform communication processing via a network such as the Internet, a WAN, a LAN, a LIN, a cloud, etc. In an embodiment, a driver 850 may also be connected to the I/O interface 825. A removable medium 855 such as a magnetic disk, an optical disk, a magneto-optical disk, a semiconductor memory, or the like may be mounted on the driver 850 as desired, such that a computer program read from the removable medium 855 may be installed in the storage device 840.

It is to be understood that the processes described with reference to the flowcharts of FIGS. 3-5 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 845, and/or may be installed from the removable medium 855. The computer program, when being executed by the central processing unit (CPU) 805, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

It is appreciated that any one of aspects can be combined with each other.

Aspect 1. A method for providing data security for a dataset in secure data computation and communication, the method comprising:
  generating a query result corresponding to a user query for the dataset;
  determining a magnitude range of the query result;
  adjusting at least one of a first tunable parameter within a first range and a second tunable parameter within a second range of a differential privacy (DP) configuration;
  calibrating an amount of random noise data based on the magnitude range and at least one of the first tunable parameter and the second tunable parameter; and
  generating a noise-laden query result by applying the amount of random noise data to the query result to satisfy an error tolerance level, thereby perturbing the query result before releasing the query result, and thereby providing data security for the dataset.

Aspect 2. The method of Aspect 1, wherein calibrating the amount of random noise data further comprises generating a plurality of random sample values within the magnitude range of the query result.

Aspect 3. The method of Aspect 2, further comprising generating a random sample noise for each of the plurality of random sample values in iterations by varying the first tunable parameter within the first range or varying the second tunable parameter within the second range.

Aspect 4. The method of Aspect 3, further comprising generating noise-laden sample values by applying the random sample noise to corresponding ones of the plurality of random sample values.

Aspect 5. The method of Aspect 4, further comprising determining a value for at least one of the first tunable parameter and the second tunable parameter from the iterations to allow the corresponding noise-laden sample values to satisfy the error tolerance level.

Aspect 6. The method of any one of Aspects 1-5, further comprising caching the query result, the magnitude range of the query result, and the error tolerance level in an expandable search grid data structure.

Aspect 7. The method of Aspect 6, further comprising:
  receiving a second user query for the dataset;
  generating a second query result for the second user query;
  determining a second magnitude range of the second query result; and
  determining a second value for at least one of the first tunable parameter and the second tunable parameter by traversing through the expandable search grid data structure based on the second magnitude of the second query result and a second error tolerance level.

Aspect 8. The method of any one of Aspects 1-7, wherein the amount of random noise is generated according to a noise distribution.

Aspect 9. The method of Aspect 8, wherein the noise distribution comprises at least one of a Laplace distribution, an exponential distribution, or a Gaussian distribution.

Aspect 10. The method of any one of Aspects 1-9, further comprising receiving a user input indicative of the error tolerance level.

Aspect 11. The method of any one of Aspects 1-10, wherein the user query comprises an aggregate query.

Aspect 12. A system for providing data security for a dataset in secure data computation and communication, the system comprising:
- a memory to store a dataset; and
- a processor to:
  - generate a query result corresponding to a user query for the dataset;
  - determine a magnitude range of the query result;
  - adjust at least one of a first tunable parameter within a first range and a second tunable parameter within a second range of a differential privacy (DP) configuration;
  - calibrate an amount of random noise data based on the magnitude range and at least one of the first tunable parameter and the second tunable parameter; and
  - generate a noise-laden query result by applying the amount of random noise data to the query result to satisfy an error tolerance level, thereby perturbing the query result before releasing the query result, and thereby providing data security for the dataset.

Aspect 13. The system of Aspect 12, wherein the processor is further configured to generate a plurality of random sample values within the magnitude range of the query result.

Aspect 14. The system of Aspect 13, wherein the processor is further configured to:
- generate a random sample noise for each of the plurality of random sample values in iterations by varying the first tunable parameter within the first range or varying the second tunable parameter within the second range; and
- generate noise-laden sample values by applying the random sample noise to corresponding ones of the plurality of random sample values.

Aspect 15. The system of Aspect 14, wherein the processor is further configured to determine a value for at least one of the first tunable parameter and the second tunable parameter from the iterations to allow the corresponding noise-laden sample values to satisfy the error tolerance level.

Aspect 16. The system of any one of Aspects 12-15, wherein the processor is further configured to cache the query result, the magnitude range of the query result, and the error tolerance level in an expandable search grid data structure stored in the memory.

Aspect 17. A non-transitory computer-readable medium having computer-executable instructions stored thereon that, upon execution, cause one or more processors to perform operations comprising:
- generating a query result corresponding to a user query for the dataset;
- determining a magnitude range of the query result;
- adjusting at least one of a first tunable parameter within a first range and a second tunable parameter within a second range of a differential privacy (DP) configuration;
- calibrating an amount of random noise data based on the magnitude range and at least one of the first tunable parameter and the second tunable parameter; and
- generating a noise-laden query result by applying the amount of random noise data to the query result to satisfy an error tolerance level, thereby perturbing the query result before releasing the query result, and thereby providing data security for the dataset.

Aspect 18. The computer-readable medium of Aspect 17, wherein the operations further comprise:
- generating a plurality of random sample values within the magnitude range of the query result;
- generating a random sample noise for each of the plurality of random sample values in iterations by varying the first tunable parameter within a first range or varying the second tunable parameter within a second range;
- generating noise-laden sample values by applying the random sample noise to corresponding ones of the plurality of random sample values; and
- determining a value for at least one of the first tunable parameter and the second tunable parameter from the iterations to allow the corresponding noise-laden sample values to satisfy the error tolerance level.

Aspect 19. The computer-readable medium of any one of Aspects 17-18, wherein the operations further comprise:
- caching the query result, the magnitude range of the query result, and the error tolerance level in an expandable search grid data structure.

Aspect 20. The computer-readable medium of any one of Aspects 17-19, wherein the operations further comprise:
- receiving a second user query for the dataset;
- generating a second query result for the second user query;
- determining a second magnitude range of the second query result; and
- determining a second value for at least one of the first tunable parameter and the second tunable parameter by traversing through the expandable search grid data structure based on the second magnitude of the second query result and a second error tolerance level.

Aspect 21. A method for providing data security for a dataset in secure data computation and communication, the method comprising:
- generating a query result corresponding to a user query for the dataset;
- determining a magnitude range of the query result;
- adjusting at least one of a first tunable parameter within a first range and a second tunable parameter within a second range of a differential privacy (DP) configuration;
- calibrating an amount of random noise data based on the magnitude range and at least one of the first tunable parameter and the second tunable parameter; and
- generating a noise-laden query result by applying the amount of random noise data to the query result to satisfy an error tolerance level.

Aspect 22. A system for providing data security for a dataset in secure data computation and communication, the system comprising:
- a memory to store a dataset; and
- a processor to:
  - generate a query result corresponding to a user query for the dataset;
  - determine a magnitude range of the query result;

adjust at least one of a first tunable parameter within a first range and a second tunable parameter within a second range of a differential privacy (DP) configuration;

calibrate an amount of random noise data based on the magnitude range and at least one of the first tunable parameter and the second tunable parameter; and generate a noise-laden query result by applying the amount of random noise data to the query result to satisfy an error tolerance level.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for providing data security for a dataset in secure data computation and communication, the method comprising:

generating a query result corresponding to a user query for the dataset;

determining a magnitude range of the query result;

adjusting at least one of a first tunable parameter within a first range and a second tunable parameter within a second range of a differential privacy (DP) configuration;

calibrating an amount of random noise data based on the magnitude range and at least one of the first tunable parameter and the second tunable parameter;

generating a noise-laden query result by applying the amount of random noise data to the query result to satisfy an error tolerance level, thereby perturbing the query result before releasing the query result, and thereby providing data security for the dataset; and caching the query result, the magnitude range of the query result, and the error tolerance level in an expandable search grid data structure.

2. The method of claim 1, wherein calibrating the amount of random noise data further comprises generating a plurality of random sample values within the magnitude range of the query result.

3. The method of claim 2, further comprising generating a random sample noise for each of the plurality of random sample values in iterations by varying the first tunable parameter within the first range or varying the second tunable parameter within the second range.

4. The method of claim 3, further comprising generating noise-laden sample values by applying the random sample noise to corresponding ones of the plurality of random sample values.

5. The method of claim 4, further comprising determining a value for at least one of the first tunable parameter and the second tunable parameter from the iterations to allow corresponding noise-laden sample values to satisfy the error tolerance level.

6. The method of claim 1, further comprising:

receiving a second user query for the dataset;

generating a second query result for the second user query;

determining a second magnitude range of the second query result; and determining a second value for at least one of the first tunable parameter and the second tunable parameter by traversing through the expandable search grid data structure based on the second magnitude range of the second query result and a second error tolerance level.

7. The method of claim 1, wherein the amount of random noise is generated according to a noise distribution.

8. The method of claim 7, wherein the noise distribution comprises at least one of a Laplace distribution, an exponential distribution, or a Gaussian distribution.

9. The method of claim 1, further comprising receiving a user input indicative of the error tolerance level.

10. The method of claim 1, wherein the user query comprises an aggregate query.

11. A system for providing data security for a dataset in secure data computation and communication, the system comprising:

a memory to store the dataset; and a processor to:

generate a query result corresponding to a user query for the dataset;

determine a magnitude range of the query result;

adjust at least one of a first tunable parameter within a first range and a second tunable parameter within a second range of a differential privacy (DP) configuration;

calibrate an amount of random noise data based on the magnitude range and at least one of the first tunable parameter and the second tunable parameter;

generate a noise-laden query result by applying the amount of random noise data to the query result to satisfy an error tolerance level, thereby perturbing the query result before releasing the query result, and thereby providing data security for the dataset; and cache the query result, the magnitude range of the query result, and the error tolerance level in an expandable search grid data structure.

12. The system of claim 11, wherein the processor is further configured to generate a plurality of random sample values within the magnitude range of the query result.

13. The system of claim 12, wherein the processor is further configured to:

generate a random sample noise for each of the plurality of random sample values in iterations by varying the first tunable parameter within the first range or varying the second tunable parameter within the second range; and generate noise-laden sample values by applying the random sample noise to corresponding ones of the plurality of random sample values.

14. The system of claim 13, wherein the processor is further configured to determine a value for at least one of the first tunable parameter and the second tunable parameter from the iterations to allow corresponding noise-laden sample values to satisfy the error tolerance level.

15. A non-transitory computer-readable medium having computer-executable instructions stored thereon that, upon execution, cause one or more processors to perform operations comprising:
- generating a query result corresponding to a user query for a dataset;
- determining a magnitude range of the query result;
- adjusting at least one of a first tunable parameter within a first range and a second tunable parameter within a second range of a differential privacy (DP) configuration;
- calibrating an amount of random noise data based on the magnitude range and at least one of the first tunable parameter and the second tunable parameter;
- generating a noise-laden query result by applying the amount of random noise data to the query result to satisfy an error tolerance level, thereby perturbing the query result before releasing the query result, and thereby providing data security for the dataset; and
- caching the query result, the magnitude range of the query result, and the error tolerance level in an expandable search grid data structure.

16. The computer-readable medium of claim 15, wherein the operations further comprise:
- generating a plurality of random sample values within the magnitude range of the query result;
- generating a random sample noise for each of the plurality of random sample values in iterations by varying the first tunable parameter within the first range or varying the second tunable parameter within the second range;
- generating noise-laden sample values by applying the random sample noise to corresponding ones of the plurality of random sample values; and
- determining a value for at least one of the first tunable parameter and the second tunable parameter from the iterations to allow corresponding noise-laden sample values to satisfy the error tolerance level.

17. The computer-readable medium of claim 15, wherein the operations further comprise:
- receiving a second user query for the dataset;
- generating a second query result for the second user query;
- determining a second magnitude range of the second query result; and
- determining a second value for at least one of the first tunable parameter and the second tunable parameter by traversing through the expandable search grid data structure based on the second magnitude range of the second query result and a second error tolerance level.

* * * * *